US008557007B2

(12) United States Patent
Read

(10) Patent No.: US 8,557,007 B2
(45) Date of Patent: Oct. 15, 2013

(54) AIR/OIL SEPARATOR AND INLET BAFFLE ARRANGEMENT

(75) Inventor: Brian Read, Eagan, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 1259 days.

(21) Appl. No.: 11/795,656

(22) PCT Filed: Jan. 18, 2006

(86) PCT No.: PCT/US2006/001849
§ 371 (c)(1),
(2), (4) Date: Jun. 2, 2008

(87) PCT Pub. No.: WO2006/078787
PCT Pub. Date: Jul. 27, 2006

(65) Prior Publication Data
US 2008/0257161 A1 Oct. 23, 2008

Related U.S. Application Data

(60) Provisional application No. 60/645,413, filed on Jan. 19, 2005, provisional application No. 60/733,976, filed on Nov. 3, 2005.

(51) Int. Cl.
B01D 45/12 (2006.01)
B01D 50/00 (2006.01)

(52) U.S. Cl.
USPC .............. 55/337; 55/476; 55/495; 55/459.1

(58) Field of Classification Search
USPC ................... 55/337, 459.1, 476, 495
See application file for complete search history.

(56) References Cited

U.S. PATENT DOCUMENTS

| 2,226,045 A | 12/1940 | Baldwin |
| 2,771,153 A | 11/1956 | Henning |
| 2,952,332 A | 9/1960 | Metro |
| 3,252,270 A | 5/1966 | Pall et al. |
| 3,364,658 A | 1/1968 | Walker |
| 3,524,304 A | 8/1970 | Wittemeier et al. |
| 3,823,791 A | 7/1974 | Sheler |
| 3,891,418 A | 6/1975 | Burger et al. |
| 4,017,275 A * | 4/1977 | Hodgson et al. ............. 95/271 |

(Continued)

FOREIGN PATENT DOCUMENTS

| DE | 30 21 631 | 12/1981 |
| EP | 0 923 975 | 6/1999 |

(Continued)

OTHER PUBLICATIONS

Schmidt "Ungewoehnliche Zyklonabscheider" *Chemi Ingeieur Technik*. vol. 62, No. 7. Jul. 1990. pp. 536-543.

(Continued)

*Primary Examiner* — Robert A Hopkins
(74) *Attorney, Agent, or Firm* — Merchant & Gould P.C.

(57) ABSTRACT

A gas/liquid separator (1) assembly is provided. The assembly generally comprises a vessel with at least one internally received serviceable separator element (10) arrangement. A unique inlet baffle arrangement (36,39) is provided, to facilitate preseparation of liquid from gases, as gases are passed through the assembly. The assembly is particularly adapted for use in air/oil separation, for example for compressors. Methods of assembly and use are also described.

14 Claims, 11 Drawing Sheets

(56) References Cited

U.S. PATENT DOCUMENTS

| | | |
|---|---|---|
| 4,070,166 A | 1/1978 | Emanuelsson |
| 4,078,036 A | 3/1978 | Keefer |
| 4,111,815 A | 9/1978 | Walker et al. |
| 4,130,487 A | 12/1978 | Hunter et al. |
| 4,217,118 A | 8/1980 | Köpf et al. |
| 4,233,042 A | 11/1980 | Tao |
| 4,272,318 A | 6/1981 | Walker et al. |
| 4,597,871 A | 7/1986 | Okouchi et al. |
| 4,661,131 A | 4/1987 | Howeth |
| 4,814,033 A | 3/1989 | Spearman et al. |
| 4,836,931 A | 6/1989 | Spearman et al. |
| 4,872,890 A | 10/1989 | Lamprecht et al. |
| 4,993,517 A | 2/1991 | Leipelt et al. |
| 5,049,171 A | 9/1991 | Presnell et al. |
| 5,053,126 A | 10/1991 | Krasnoff |
| 5,242,475 A | 9/1993 | Stine et al. |
| D366,516 S | 1/1996 | Stewart |
| 5,605,555 A | 2/1997 | Patel et al. |
| 5,660,607 A | 8/1997 | Jokschas et al. |
| 5,676,717 A | 10/1997 | Cope et al. |
| 5,730,766 A | 3/1998 | Clements |
| 5,792,711 A | 8/1998 | Roberts |
| 5,803,941 A | 9/1998 | Berkhoel et al. |
| 5,853,443 A | 12/1998 | Rodgers et al. |
| 5,916,435 A | 6/1999 | Spearman et al. |
| 6,048,376 A | 4/2000 | Miller |
| 6,093,231 A | 7/2000 | Read et al. |
| 6,136,076 A | 10/2000 | Read |
| 6,168,647 B1 | 1/2001 | Perry, Jr. et al. |
| 6,364,921 B1 | 4/2002 | Raether et al. |
| 6,387,162 B1 | 5/2002 | Kosmider et al. |
| 6,419,721 B1 | 7/2002 | Hunter |
| 6,485,535 B1 | 11/2002 | Linnersten et al. |
| 6,485,544 B1 | 11/2002 | Ziske |
| 6,488,746 B1 | 12/2002 | Kosmider et al. |
| 6,500,243 B2 | 12/2002 | Cook et al. |
| 6,572,667 B1 | 6/2003 | Greif et al. |
| 6,585,790 B2 | 7/2003 | Linnersten et al. |
| 6,596,043 B1 | 7/2003 | Morgan |
| 6,692,639 B1 | 2/2004 | Spearman et al. |
| 6,797,025 B2 | 9/2004 | Linnersten et al. |
| D499,177 S | 11/2004 | Kosmider et al. |
| 6,916,353 B2 | 7/2005 | Tang |
| D545,396 S | 6/2007 | Casey et al. |
| 7,332,009 B2 | 2/2008 | Casey et al. |
| 2002/0178921 A1 | 12/2002 | Kosmider et al. |
| 2003/0051450 A1 | 3/2003 | Linnersten et al. |
| 2004/0000236 A1 | 1/2004 | Linnersten et al. |
| 2004/0035097 A1 | 2/2004 | Schlensker et al. |
| 2005/0039601 A1 | 2/2005 | Kosmider et al. |
| 2005/0120687 A1 | 6/2005 | Casey et al. |
| 2006/0123744 A1 | 6/2006 | Read |
| 2009/0049812 A1 | 2/2009 | Casey et al. |

FOREIGN PATENT DOCUMENTS

| | | |
|---|---|---|
| EP | 1 059 994 | 4/2004 |
| FR | 1 278 115 | 10/1960 |
| FR | 1 554 970 | 1/1968 |
| GB | 1 566 220 | 4/1980 |
| GB | 2 195 558 A | 4/1988 |
| WO | 98/43723 | 10/1998 |
| WO | 99/43412 | 9/1999 |
| WO | 99/47211 | 9/1999 |
| WO | 00/23171 | 4/2000 |
| WO | 00/23172 | 4/2000 |
| WO | WO 00/64321 | 11/2000 |
| WO | 00/72948 | 12/2000 |
| WO | 01/10532 | 2/2001 |
| WO | 01/80982 | 11/2001 |
| WO | 02/02206 A2 | 1/2002 |
| WO | 2004/052503 | 6/2004 |
| WO | WO 2004/052503 | 6/2004 |
| WO | 2005/049177 | 6/2005 |
| WO | 2006/078787 A2 | 7/2006 |

OTHER PUBLICATIONS

Schmidt et al. "Stromung IM Langen Spiralwindsichter." *Verfahrenstechnik.* vol. 10. 1976.

\* cited by examiner

AIR/OIL SEPARATOR AND INLET BAFFLE ARRANGEMENT

This application is being filed on 18 Jul. 20007 as a National Stage Patent Application of PCT International Patent application number PCT/US2006/001849 in the name of Donaldson Company, Inc., a U.S. national corporation, applicant for the designation of all countries except the US, and Brian Read, a citizen of the United Kingdom, applicant for the designation of the US only.

The present application includes disclosure contained within, U.S. Provisional 60/645,413, filed Jan. 19, 2005; and, U.S. Provisional 60/733,976, filed Nov. 3, 2005. A claim of priority to each of these provisional applications is made. In addition, each of these two provisional applications is incorporated herein by reference, in its entirety.

The present disclosure relates to improvements and modifications in arrangements described in PCT/US2004/038369; and PCT/US2003/38822.

FIELD OF THE INVENTION

The present disclosure relates to gas/liquid separations. The disclosure particularly concerns an inlet baffle arrangement for use during a gas/liquid separation. It also concerns apparatus for gas/liquid separation. A particular, useful, application is in an air/oil separator for air compressors.

BACKGROUND

Certain gas/liquid separation assemblies, for example as used with air compressors, include two general components: a vessel with a cover, and a removable and replaceable (i.e., serviceable) separator element unit, construction or arrangement. In some assemblies a single (one) serviceable separator element is used as the separator element construction; in others, multiple serviceable elements are used. In general, operation involves directing a gas/liquid flow into the vessel. The gas flow is eventually directed through the serviceable separator unit, i.e., through the serviceable separator element or elements. With passage through the separator unit, liquid coalescing and drainage occurs. As a result, an entrained liquid concentration, within the gas stream, is reduced. Periodically, the serviceable element(s) are removed and replaced.

SUMMARY

According to the present disclosure, a gas/liquid separator assembly is provided. The assembly, in general, includes a vessel and a preseparation assembly. In use, the assembly also includes at least one removable and replaceable, i.e., serviceable, gas/liquid separator element.

In general, the preferred vessel includes an outer wall, typically cylindrical, having a gas flow inlet, a gas flow outlet and a lower sump. The inlet is preferably a tangential inlet, although alternatives are possible.

The preseparation assembly preferably comprises an inlet baffle arrangement including an axial shroud arrangement mounted with an axial extension spaced from the outer wall to define a gas flow annulus. Preferably the axial shroud arrangement is a radially continuous structure. The axial shroud arrangement preferably has an upper impermeable portion and a lower permeable portion.

The preseparation assembly defines a mounting space for at least one removable and replaceable, i.e., serviceable, gas/liquid separator element. The mounting space has an axial dimension, corresponding in general to an axial length of each of the at least one gas/liquid separator elements used with the assembly.

In some examples, the axial shroud is positioned with the impermeable portion oriented to extend spaced inwardly from the vessel inner wall and to extend along the at least one gas/liquid separator element at least 20% and not more than 60% of the axial length of this mounting space and of the separator element. Typically, in those examples, the axial shroud is configured to extend at least 35% and not more than 50% of this axial length. In another example, such an extension of the impermeable portion is not present.

The preseparation assembly, i.e. the inlet baffle arrangement, preferably includes an impermeable inlet cover or hood, which extends between the axial shroud and a portion of the vessel outer wall above the gas flow inlet and below the gas flow outlet. A gas flow inlet is preferably positioned to direct inlet gas flow into the gas flow annulus at a location below the hood.

A variety of specific preferred configurations and features are described. The disclosure also provides preferred inlet baffle arrangements, for use in preferred gas/liquid separator assemblies; and, positioning of inlet baffle arrangements into pressure vessels.

The disclosure also relates to methods of assembly and use. In particular a method of assembly would involve positioning a preseparation assembly or inlet baffle arrangement as defined herein, inside of a pressure vessel for gas/liquid separator assembly, to define a preferred inlet annulus and other features.

A preferred method of use involves directing gas flow having liquid therein, through a preseparation assembly as defined, and then through one or more serviceable separator elements. Such a method would typically include collecting at least a portion of separated liquid in a lower sump within the gas/liquid separator assembly. The method would preferably include directing the gas flow into the preseparation assembly as described.

DETAILED DESCRIPTION

I. General Background

In general, gas/liquid separator assemblies of the type of concern herein include three general components: a vessel arrangement; an inlet baffle or preseparator arrangement; and, an internally received, removable and replaceable, (i.e., serviceable) gas/liquid separator arrangement. The internally received, removable and replaceable, (i.e., serviceable) separator arrangement generally comprises one or more separators (or separator cartridges elements) that, in time, are removed and replaced during servicing operations; hence the term "serviceable." Each serviceable separator element includes a media pack, through which the gases are passed. Each media pack typically includes layers or regions of media as coalescing and drain stages.

Herein, gas/liquid separator assemblies or separator elements will be classified as either "in-to-out flow" or "out-to-in flow," depending on whether, in use, gas flow (through the media pack of each separator element) is directed from an outside of the serviceable separator element(s) to an interior; or, from an interior of the serviceable separator element(s), to an exterior. Certain of the techniques described herein can be applied to either or both. However, the particular examples shown, and specific features described, are applied to arrangements with in-to-out flow through the separator element(s).

A typical application for the techniques described herein is as a gas/oil (specifically air/oil) separator for a compressor arrangement. Such an apparatus is generally adapted for operation with internal pressures on the order of about 60 psi to 200 psi (about 4.2-14.06 kg/sq.cm), for example about 80-120 psi (about 5.6-8.44 kg/sq.cm), typically about 100 psi (about 7 kg/sq.cm). Examples of use would be with compressors of 20 hp to 500 hp (about 14.9-373 Kw).

The throughput for an air/oil separator for use with a compressor arrangement is typically measured in terms of volume of free air (i.e., non-compressed volume) passed through the separator assembly. A typical operating flow would be from on the order of 100 cubic feet per minute (47,000 cu.cm/sec) up to several thousand cubic feet per minute (about 1 million cu.cm/sec or more).

II. The Embodiment of FIGS. 1 and 2

Figure 1:
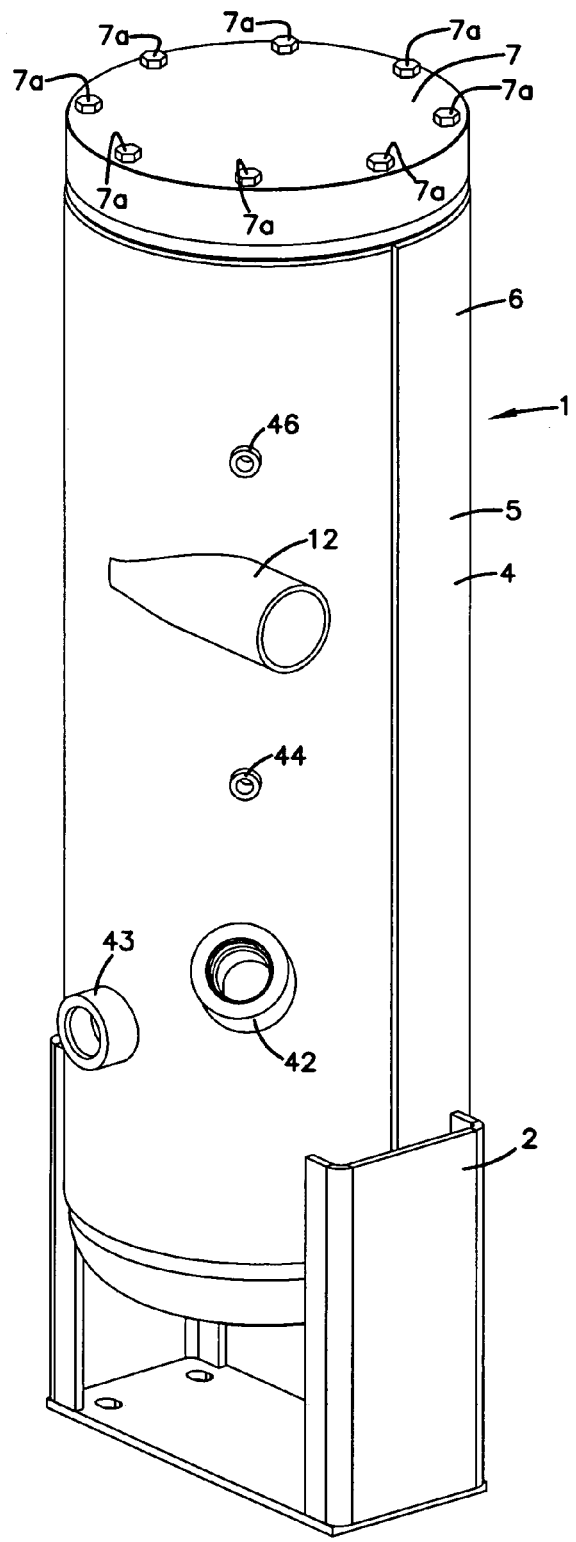
FIG. 1 is a schematic perspective view of a compressor vessel arrangement including a gas/liquid separator assembly therein, according to the present disclosure.

The reference number 1, FIG. 1, generally designates a gas/liquid separator assembly according to a first embodiment of the present disclosure. In general, the assembly 1 comprises: a stand arrangement 2; a vessel 4, in this instance a pressure vessel 5, including housing 6 and service or access cover 7; and, an internally received, removable and replaceable (i.e., serviceable), separator unit 9, FIG. 2. In the example depicted, separator unit 9 comprises a single, serviceable, separator element or separator 10, although alternatives with multiple separators 10 are possible. The particular separator 10 depicted is an in-to-out flow separator 11, as will become apparent. An o-ring or other seal can be provided between the cover 7 and housing 6. The cover 7 is secured in place by bolts 7a.

Figure 2:
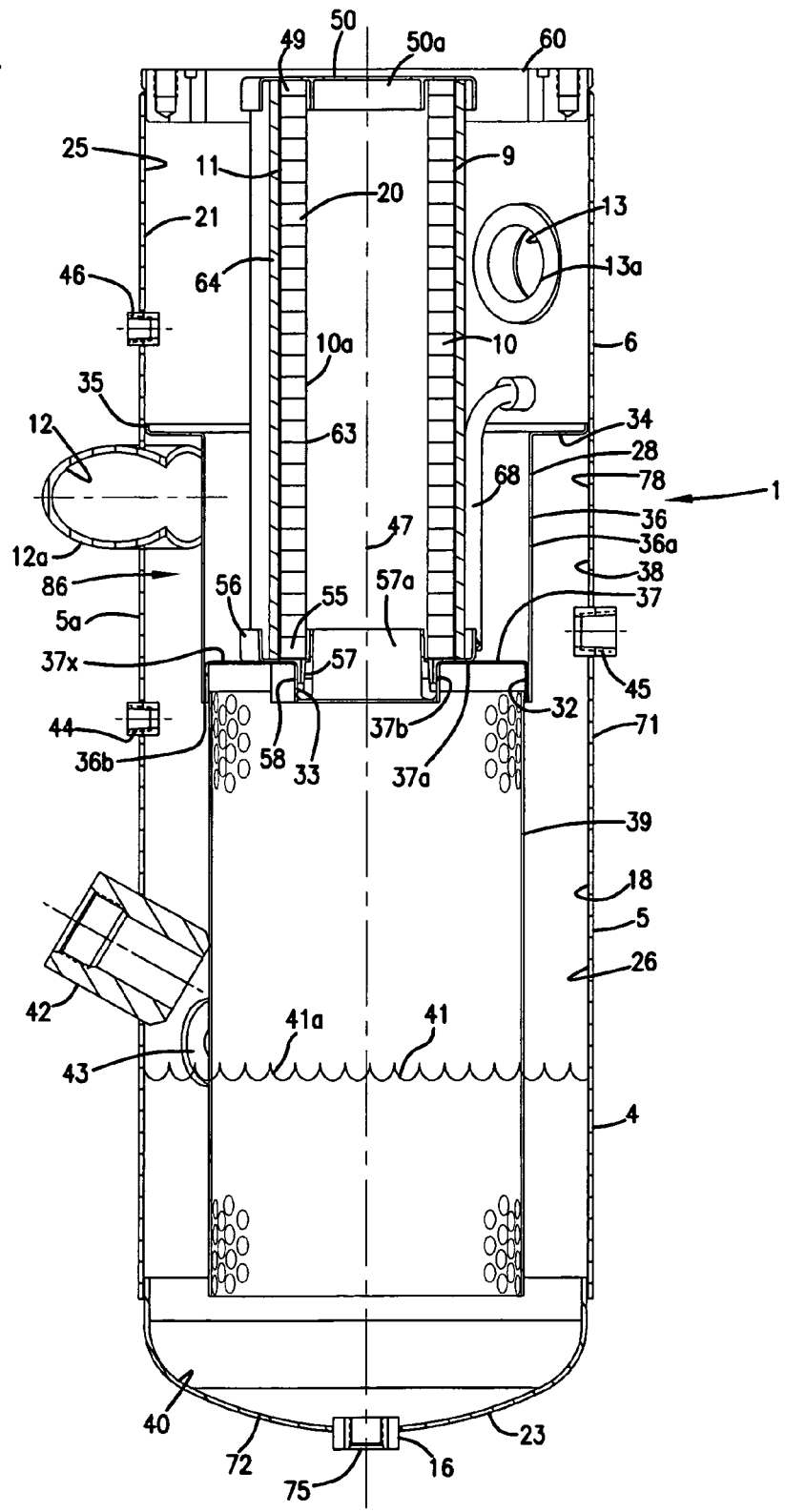
FIG. 2 is a schematic cross-sectional view of the arrangement depicted in FIG. 1, with a service cover removed.

In general, the pressure vessel 5 includes a gas flow inlet 12, a gas flow outlet 13 (FIG. 2) and a liquid outlet arrangement 16 (FIG. 2). In FIG. 1, the pressure vessel 5 is shown supported on the base or stand arrangement 2, with cover removed for convenience.

In operation, a gas stream (typically compressed air) having liquid (typically oil) therein, is directed into an interior 18 of the assembly 1 through inlet 12. Within the assembly 1, the gas stream is eventually directed into an interior region 10a of the separator 10. Eventually the gases pass from interior 10a, through media pack 20, of the separator 10, and then pass outwardly from the pressure vessel 5, in this instance through gas flow outlet 13.

The particular arrangement shown in FIGS. 1-2, then, uses an in-to-out flow separator unit 11. By this, it is meant that when the gases pass through the media pack 20 of the separator unit 11, they pass from interior 10a of separator 10 (defined and surrounded by media pack 20) to an exterior region 21.

Referring to FIG. 2, for the particular assembly 1 depicted: the inlet 12 is a sidewall inlet 12a, meaning it extends through the pressure vessel sidewall 5a; outlet 13 is also a sidewall outlet 13a, meaning it extends through the pressure vessel sidewall 5a; and, liquid outlet arrangement 16 includes a bottom drain. By "bottom" in this context, reference is meant to a lower portion 23 of assembly 1, FIG. 2, when oriented for typical use, as shown in FIGS. 1 and 2. The term "sidewall" is meant to refer to the housing wall portion 5a which extends between the cover 7 and the bottom 23.

For the particular assembly 1 depicted, the inlet 12 is located in the sidewall 5a at a lower position than the outlet 13.

It is noted that the bottom liquid outlet arrangement 16 can include two couplings positioned for direction of liquid contained within interior 18 to various alternate locations, as desired. For example, a first coupling can be a drain coupling, to empty the vessel or housing 4 of liquid; and, a second coupling can be a liquid outlet, for circulating liquid from the housing 4 into equipment. Of course, a variety of liquid outlet arrangements 16, using one or more couplings, can be used depending on the system and desired liquid flow.

To facilitate operation, the assembly 1 generally defines an enclosed upper region 25, FIG. 2, and an enclosed lower region 26, in this instance separated by tube sheet structure 28. The tube sheet structure 28 is generally solid and non-porous to gas flow there through, except in specific regions as defined. In this instance, the tube sheet structure 28 defines one central aperture 33 therein to accommodate mounting of a single separator 10. But for aperture 33, the tube sheet structure 28 is generally solid and non-permeable above shroud 39 and preferably includes: an annular cover or hood 34 positioned above the inlet 12, below outlet 13 and including a peripheral mounting ring 35; a depending central baffle wall 36, in this instance a cylindrical wall 36a; and, a bottom plate or base 37, with central aperture 33 therein. The base 37 is attached adjacent at lower edge 36b of wall 36. The wall 36 and base 37 generally define an upper sump 37x above the base 37, as discussed below. As will be understood from detailed description below, aperture 33 provides a flow channel for gas flow from lower region 26 into upper region 25, specifically directed into the separator unit 9.

As will be apparent from the following descriptions, bottom plate or base 37 can be provided with a plurality of apertures therein, to accommodate an equal number of separator elements 10 positioned within upper space 25. Typically assemblies 1 will include 1-3 separator elements, depending on the size and throughput expected, although alternatives are possible. Thus, the bottom plate or base 37 is a plate for mounting separator elements.

It is also noted that the specific shape of the separator unit or separator 10 can be varied. Examples include: cylindrical with circular cross-section, as described in PCT/US2003/38822; and, elliptical cross-section, as described in PCT/US2004/038369, although alternatives are possible.

The central wall 36 is preferably a radially continuous and impermeable wall. By the term "radially continuous" in this context, it is meant that it extends continuously around a central axis 47. There is no specific requirement that in all applications the wall 36 be a cylindrical wall 36a. Such a configuration, however, will be convenient. The wall 36 is spaced inwardly from wall 5 and generally extends downwardly from cover or hood 34 at a location above inlet 12, to a position below a location of central wall 37a of base 37, discussed below. The extension of impermeable wall 36 below central wall 37a is typically at least 12 mm and typically 19-54 mm, which provides advantage with respect to flow through assembly 1.

Figure 4:
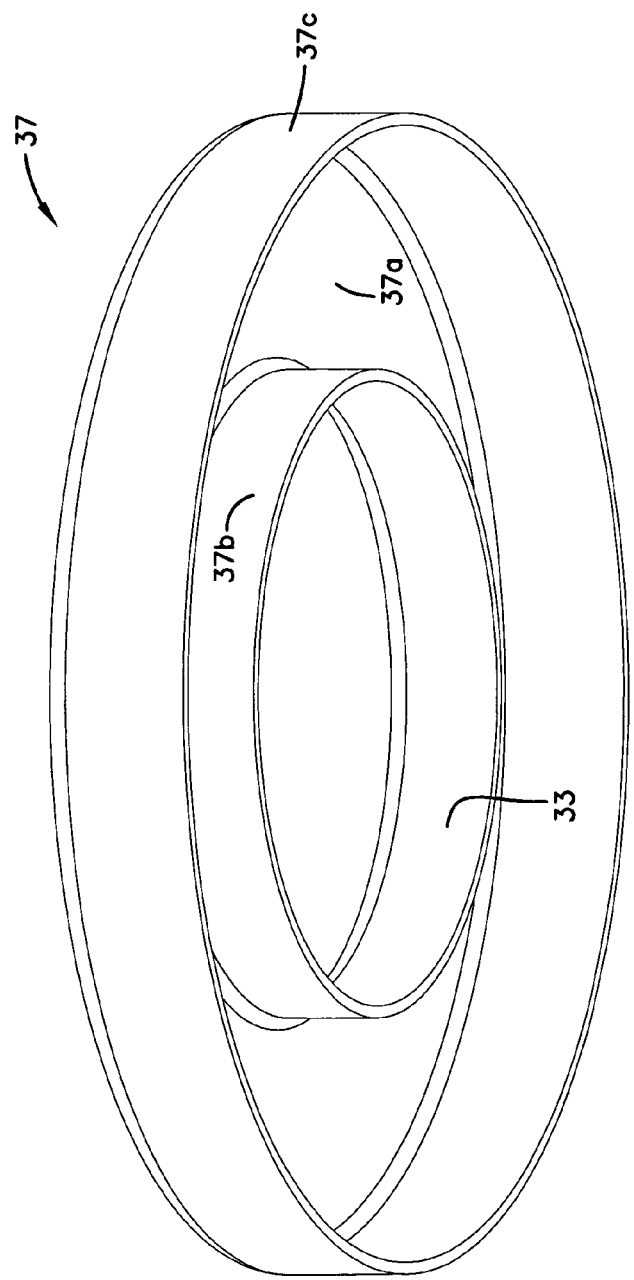
FIG. 4 is an enlarged bottom perspective view of a component used in the inlet baffle assembly of FIG. 3.

Referring to FIGS. 2 and 4, the wall 36 is positioned spaced from the sidewall 5a to form a gas flow annulus 38 therebetween. When gases are first directed into pressure vessel 5 through inlet 12, FIG. 4, they are directed into this annulus 38.

In certain applications, axial length of impermeable central wall 36 above base 37 is generally at least 20% and not more than 60% of the axial length of the mounting space in which the media pack 20 of the separator 10 is positioned (or 20%-60% of the axial length of the separator media pack 20). For such examples, more preferably the shroud is configured to extend at least 35% and not more than 50% of this axial length. What this means, is that in selected arrangements the wall 36 does not extend around and along the media pack 20 any more than about 60% of the axial length of the media pack 20, but at least 20% of this axial length, etc. In one example discussed below at FIGS. 9 and 10, the wall 36 does not extend into the space where the separator would be mounted.

Typically wall 36 extends downwardly from a point equal to a bottom of the inlet 12, a distance of about twice the diameter of the inlet 12.

Referring in general to bottom plate or base 37, the particular base 37 shown includes central ring or wall 37a and inner and outer depending flanges 37b and 37c respectively. The outer depending flange 37c is sized to engage in inner surface of wall 36, adjacent end 36b. Inner flange 37b generally defines a mounting aperture arrangement for separator arrangement 9.

Again, the flange 37b would define one or more apertures, depending on the number of separators 10 used in the assembly 1. The particular arrangement depicted in FIGS. 1 and 2, uses one serviceable separator 10.

Preferably flange 37c and impermeable wall 36 extend downwardly toward end 23, from wall 37a, at least 12 mm, and typically 19-51 mm, as mentioned above. Thus, gases within annulus 38 must pass at least 12 mm, typically 19-51 mm, past wall 37a before they can turn and begin to enter aperture 33.

Tube sheet structure 28 comprises a portion of an inlet baffle or preseparator arrangement. As described below, this arrangement facilitates preseparation of substantial amounts of liquid entrained in the gas flow entering assembly 1 through inlet 12, prior to passage through aperture 33 into proportion 25 of the assembly 1. This preseparation arrangement or inlet baffle arrangement further includes porous shroud 39.

Figure 2A:
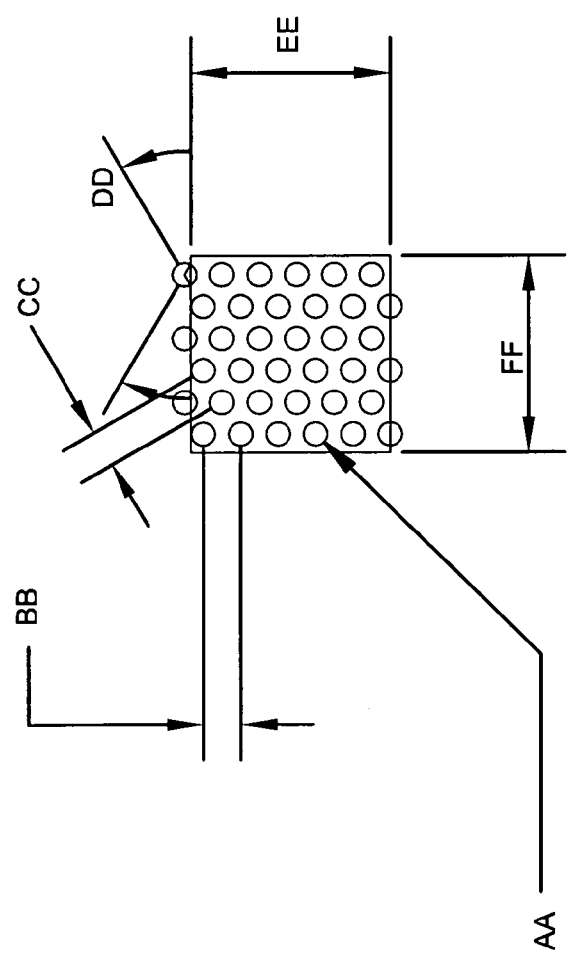
FIG. 2A is an example perforation pattern for a component depicted in FIG. 2.
Figure 8:
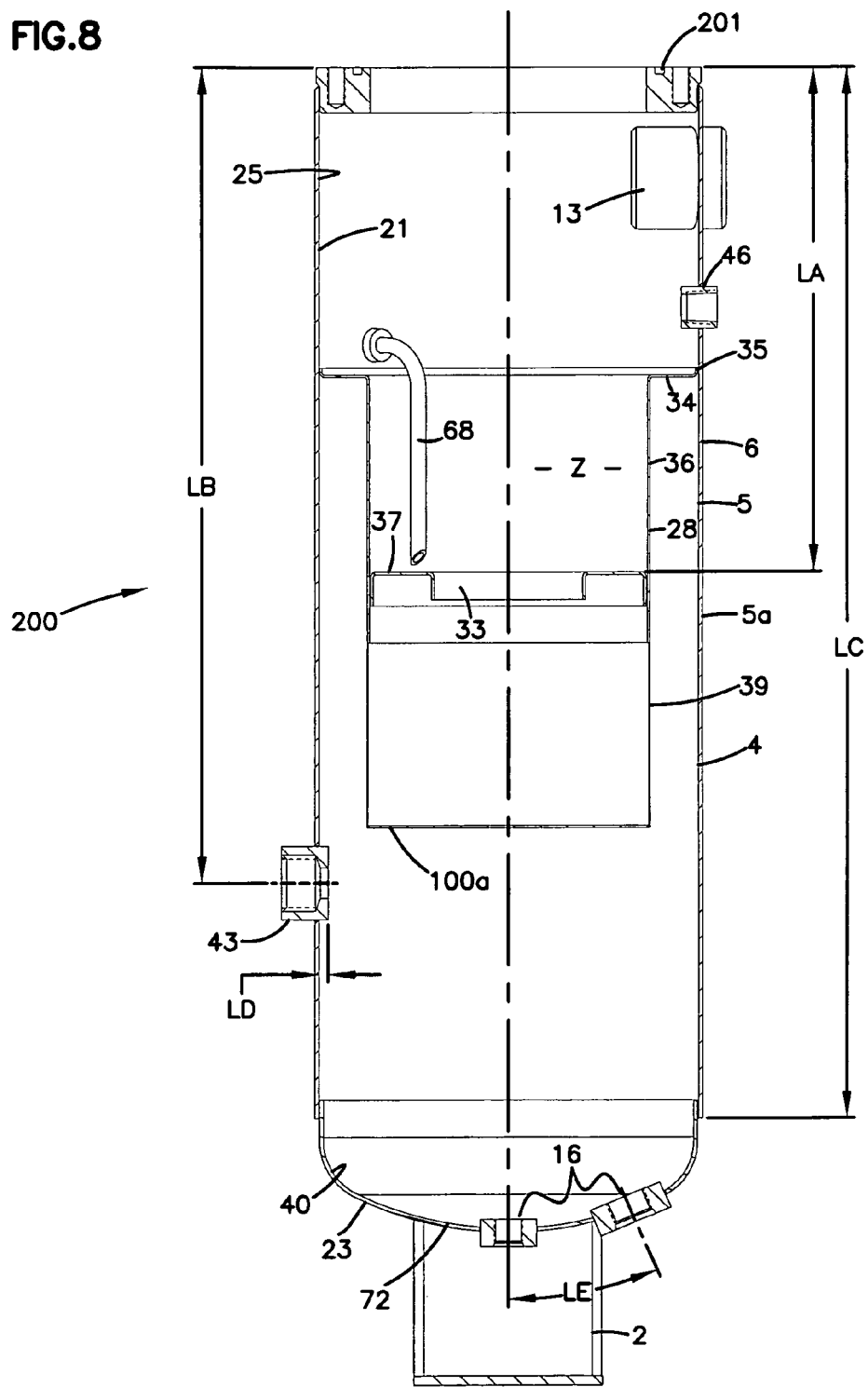
FIG. 8 is a schematic cross-sectional view analogous to FIG. 2, depicting the inlet baffle assembly mounted therein, FIG. 3.

In particular, the assembly 1 includes, positioned in interior 18, porous shroud 39 depending downwardly from wall 36 and around aperture 33. Shroud 39 is typically circular in cross-section, although alternate shapes can be used. The shroud 39 is porous, for example perforated, for passage of air flow therethrough. A typical porous definition described in U.S. Provisional 60/645,413, incorporated herein by reference, would be at least 25% porous, typically at least 30% porous, for example, 35-45%. Alternate porous amounts and patterns could be used. An example pattern described in U.S. 60/645,413 would use 0.125 inch (3.2 mm) diameter holes; as shown in FIG. 2A, which provide holes having an area of 0.012 sq. inch (7.74 sq.mm). In FIG. 8: AA (the hole diameter) is 0.125 inch (3.2 mm); BB is 0.188 inch (4.78 mm); CC is 0.187 inch (4.75 mm); angle DD is 120 degrees; EE is 1.00 inch (25.4 mm); FF is 1.00 inch (25.4 mm). In this example, there are 32.5 holes/sq.inch (0.05 holes/sq.mm), and the open area is 39.88%.

The shroud 39 shown comprises a metal sheet with a porous pattern described; however, an expanded metal wall could alternatively be used for porous shroud 39. It is typical to use a shroud 39 with an even distribution of apertures therethrough over the entire surface thereof.

Although alternatives are possible, in the example shown in FIG. 2, the porous shroud 39 extends downwardly from wall 36 a distance sufficiently so that remote or lower end 39a will be immersed within a lower sump operational liquid level, during normal operation of assembly 1. Typically, whether it extends into the operational liquid level or not, the porous shroud 39 extends at least 80 mm, often at least 90 mm and usually no more than 1000 mm. Examples are 80 to 320 mm, although alternatives are possible.

Advantages from use of a porous shroud 39 are discussed below.

The imperforate wall 36 and the porous shroud 39 are often sized and positioned spaced from pressure vessel wall 5a at least 25 mm, often 28-45 mm, although alternatives are possible, depending on the circumstances. More specifically, the distance of imperforate wall 36 from the pressure vessel wall 5a is generally set to provide a velocity for the air flow, around the annulus therebetween and during initial circling of the air flow around shroud 39, which is the same as the entry velocity through the inlet aperture. Thus with very large inlet apertures, and very large systems, larger spacing will be used. In most applications, the spacing of imperforate wall 36 from vessel wall 5a will not be more than about 102 mm.

Lower region 26 includes lower sump region 40, in this instance depicted with liquid (oil) 41 therein. Much of the liquid initially included with gases entering through the gas flow inlet 12 drains to lower sump region 40, before the gases even pass through aperture 33 into upper region 25.

Referring to FIG. 2, assembly 1 includes, in region 26, couplings 42, 43, 44 and 45 for various purposes. For example, coupling 42 is an oil fill, coupling 43 is a sight glass, coupling 44 is an instrument port of tap for a temperature sensor, pressure sensor or both, and coupling 45 is for a relief valve. The particular size, number and location of couplings in section 26 is a matter of choice, for the particular operation intended.

Upper region 25 includes coupling 46, FIG. 2. For example, coupling 46 is for a pressure tap. The particular number and size of couplings in upper region 25 is also a matter of choice, depending on the functions or purposes intended.

Referring to FIG. 2, in sump 40, an example operating liquid (oil) level 41a is shown. In typical use, the amount of oil contained within sump 40 is, for example, a matter of choosing an appropriate oil volume that will lead to a desired average temperature or cooled temperature, appropriate for directing oil from sump 40 back to the mechanical system for the compressor of concern. A temperature probe provided through one of the ports or couplings can be used to monitor this. Herein the term "operational liquid level" is meant to refer to an upper level of liquid contained within lower sump 40, during typical and normal operation.

As indicated, separator 10 is a removable and replaceable, i.e., serviceable, component. The separator 10 comprises media pack 20 secured at one end 49 to an end cap 50. For the particular assembly shown in FIGS. 1 and 2, the end cap 50 is a closed end cap 50a, meaning that it has no aperture therethrough which communicates with interior 10a of separator 10.

At an end 55 opposite the end cap 50, the separator 10 includes an end cap 56, with a projection 57 having central aperture 57a therein. The central aperture 57a is a gas flow aperture, for passage of gases into interior 10a, during use. In general, aperture 57a is aligned with aperture 33, such that gas flow passing through aperture 33 from region 26 into region 25, is directed into interior 10a of separator 10.

A variety of seal arrangements could be used at the juncture between separator 10 and tube sheet construction 28. For example either radial seals or axial seals or both can be used. In the example shown in FIG. 2, a radial seal structure 58 is used.

More specifically, around central aperture 57a, sealing ring 58 is provided, to cause a radial seal with flange 37b. The flange 37b defines central aperture 33. The sealing ring 58 may comprise, for example, an o-ring. The sealing ring 58 generally prevents eases from escaping interior 10a, into region 21, without passage through the media pack 20.

Referring to FIG. 2, it is noted that the axial length of separator 10 is slightly shorter than the distance between base 37 and opening 60. In use, the separator 10 would be installed with projection 57 pushed into the bottom plate or base 37, i.e., into flange 37b, by hand, with insertion through opening 60 with cover 7 removed. In FIG. 2, the assembly 1 is depicted with cover 7, FIG. 1, removed to show this. Cover 7 (FIG. 1) would then be installed in place. Under operating pressures, the separator 10 would typically be biased until it bumps against cover 7. The radial seal arrangement can be configured to allow for this movement, without loss of seal. Construction in this manner facilitates manufacture of the separators 10, since tight manufacturing tolerances for length would not be critical.

The term "radial" when used herein reference to a direction or seal, is meant to refer to a direction toward or away from central axis 47. The term "axial" when used in connection with a direction, seal or dimension, is meant to refer to a general direction of the longitudinal extension of axis 47. Thus, a radial seal is a seal with the sealing force or pressure directed toward or away from axis 47; and, an axial seal is a seal with a force or direction parallel to axis 47.

In general, if the separator 10 was provided with an axial seal, in general a seal ring would be provided projecting axially outwardly from end cap 56. This seal would be positioned to engage a portion of base 37, during sealing. An arrangement to provide pressure would be needed, to ensure the seal. This pressure could be provided by the cover 7, or by alternate constructions.

The specific construction of the media pack 20 is not critical to the general principles of inlet baffles described herein, and is a matter of choice. In general, the size and construction of the media pack 20 will be selected based upon such issues as the air flow, the level of efficiency desired, the amount of restriction acceptable, the lifetime of use preferred, the size of space available and materials available.

Media packs for air/oil separators are described, for example in the U.S. Pat. No. 6,093,231; U.S. Pat. No. 6,136,016; PCT Publication WO 99/47211; PCT Publication WO 99/43412; U.K. 1,603,519; U.S. Pat. No. 6,419,721; U.S. Pat. No. 4,836,931; PCT Publication WO 04/052503 and PCT Application US 2004/038369 filed Nov. 16, 2004, the complete disclosures of which are incorporated herein by reference. The principles of these types of arrangements can, for example, be applied for separator units herein.

Referring to FIG. 2, media packs for separators 10 will typically include an upstream coalescing stage 63, and downstream drain stage 64. Since the separator 10 is "in-to-out," the coalescing stage 63 is surrounded by the drain stage 64. Various liner structures or scrim structures to facilitate assembly or operation can be used. In general, in the coalescing stage 63, fine liquid particles carried in the gas stream coalesce. The coalesced liquid particles generally are driven into the drain stage 64, and then drain from the drain stage 64, into upper sump region 37X. A scavenge tube or tube arrangement 68, FIG. 2, is shown projecting into upper sump 37x, for drainage of collected liquid from region 37x.

Referring to FIGS. 1 and 2, the pressure vessel 5 shown has a cylindrical outer wall 71 and a rounded bottom 72. The cylindrical outer wall 71 defines the central axis 47 which generally passes through a center 75 of the rounded bottom 72.

In general, gas/liquid separators of the type of concern here are provided with one of two types of gas inlet arrangements. A first, generally referred to herein as a tangential gas inlet, is a gas inlet which has a center line directed generally tangentially with respect to the rounded or cylindrical outer wall. The drawings of this disclosure show a tangential inlet at 12a.

The tangential inlet is generally preferred, since the inlet air is directed into a cyclonic pattern around region 78, FIG. 2 (i.e., in annulus 38), between outer wall 5 and wall 36. This facilitates separation.

The second type of gas inlet, not shown, is generally referred to herein as a "radial" or "radially directed" inlet. In general, a radially directed inlet is an inlet directed with a gas flow generally toward the central longitudinal axis 47 of the pressure vessel 5. A radially directed inlet is described for example in PCT Application US 2004/038369 filed Nov. 16, 2004 and PCT Publication WO 04/052503, incorporated herein by reference. With such an inlet, an additional skirt described is shown to provide desirable direction to the air flow, within the region between the sidewall and the baffle. It is noted that the assembly of PCT Publication WO 04/052503 does not include depending porous shroud analogous to shroud 39. Such a shroud could be used with such an arrangement, however, to advantage.

Referring to FIG. 2, as a result of the structure described, the assembly 1 includes a preseparation arrangement 80. In general, the preseparation arrangement 80 provides for some initial separation of gas and liquid, upon gas/liquid flow entering interior 18, through entrance or inlet 12. For the particular arrangement depicted, the preseparation arrangement 80 includes tube sheet structure 28 and porous shroud 39.

In general terms, the preseparation arrangement 80 is configured and positioned so that when liquid and gases enter inlet 12, they are moved through an arcuate path which: tends to drive a portion of the liquid into baffle or wall structure, for collection and drainage out of the gas flow; and, which directs the gases (gas/liquid mixture) into a preferred flow path, to facilitate separation. In general, an object is to obtain substantial gas/liquid separation, before the gases are passed into the serviceable separator unit 9, without undesirable levels of restriction.

Many air/oil separators utilized with compressors are used in circumstances in which the inlet flow includes not only oil particles entrained in gases, but also a large amount of bulk liquid oil flow. Such an oil flow into the separator assembly 1, for example, can be on the order of 8 to 100 gallons per minute (about 30-380 liters/minute). Thus, the assembly 1 must be configured to manage a large amount of bulk oil flow, along with the gas flow and gas/liquid separation.

Referring to FIGS. 1 and 2, as the gas/liquid combination enters pressure vessel 5 through inlet 12, it is directed in a circular flow pattern around wall 36 underneath cover or hood 34. This gives some initial cyclonic separation of liquid, from the compressed gases. Bulk liquid flow of course will generally drop down into lower sump 40. The circulating compressed gases will then flow under a bottom edge 36b of impermeable wall 36. At this point, there will be gas flow through porous lower shroud 39. Flow passage through lower shroud 39 will provide two general beneficial affects: first, there will be a reduced turbulence in the air flow, thus lessening reentrainment of liquid into the gases before they pass into separator 10. Secondly, the requirement to pass through the porous shroud 39 will tend to even out flow and avoid relatively fast and relatively slow locations. This too will facilitate separation and avoidance of reentrainment.

The distance of extension of the shroud 39 from bottom edge 36b, then, is a matter of design for each system. Generally what is required is that shroud 39 be sufficiently axially long, to stabilize flow. In some instances it can be sufficiently long to be submerged within the liquid level 41a during any normal use. Typically shrouds 39 in the order of at least 80 mm long, sometimes at least 90 mm long, not more than 1,000 mm long and typically 80-320 mm usually will be used, depending on the system.

III. Example Componentry, FIGS. 3-10

In FIGS. 3-10 example componentry is indicated. The componentry of FIGS. 3-8 is particularly sized for inclusion as an inlet baffle arrangement in a separator assembly for use with a compressor of 50-60 horsepower. (In FIGS. 9 and 10 the componentry is sized for a 30 hp compressor.)

Figure 3:
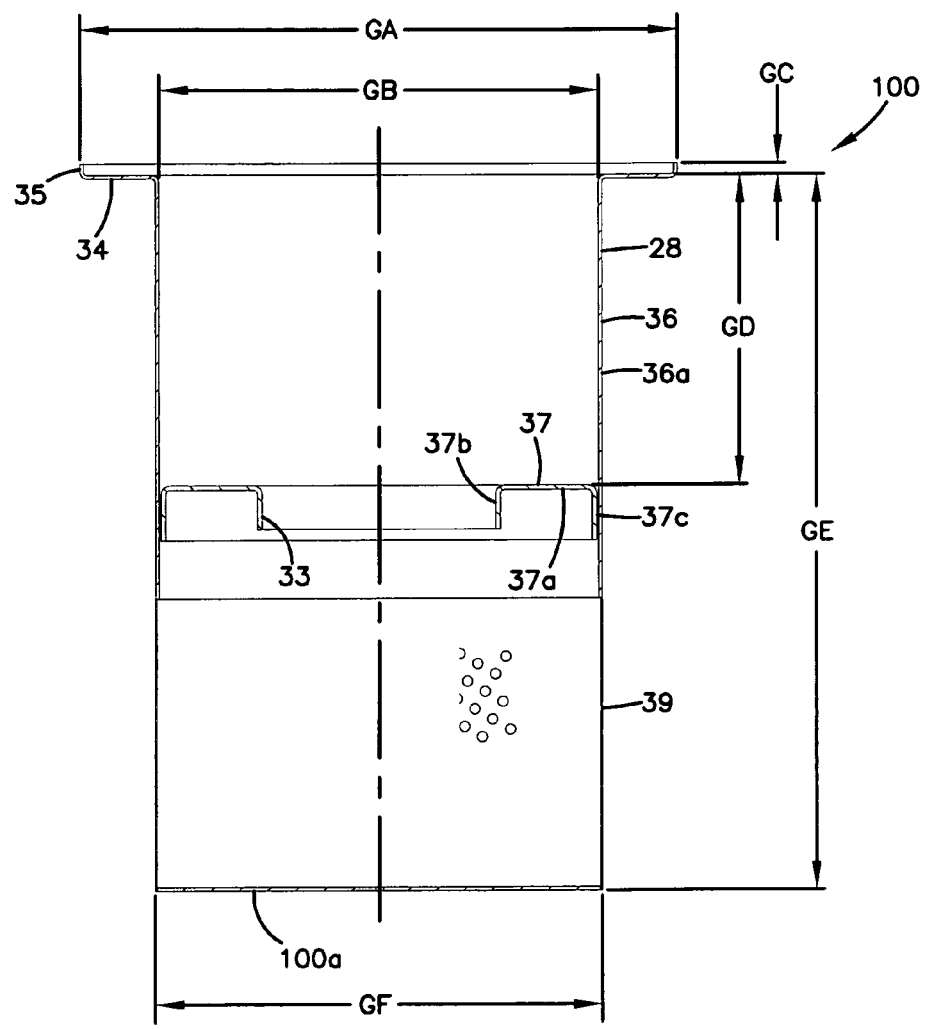
FIG. 3 is a cross-sectional view of an inlet baffle assembly usable in an arrangement generally in accord with FIGS. 1 and 2, but with a perforated around not extending into a liquid surface.

In FIG. 3, the inlet baffle arrangement 100 is depicted. The inlet arrangement 100 is shown with reference numerals indicating analogous parts to those previously described herein. The inlet baffle arrangement 100 can be mounted in an appropriately sized housing, and used similarly to the features described in FIGS. 1 and 2.

The example dimensions provided in FIG. 3 are as follows: GA=254 mm; GB=187.3 mm; GC=4.8 mm; GD=134.9 mm; GE=311.2 mm; GF=190.5 mm.

In FIG. 3, at 100a, bottom plate is shown extending across a bottom of porous screen 39. The plate 100a can be provided if desired, with a central drain aperture therein. The bottom plate 100a, located in a bottom region of depending porous screen 39, can help inhibit foam rise along an interior of screen 39, when the assembly 100 is used in association with a liquid that tends to foam. The plate 100a can be secured in position by spot welding or other techniques.

Figure 9:
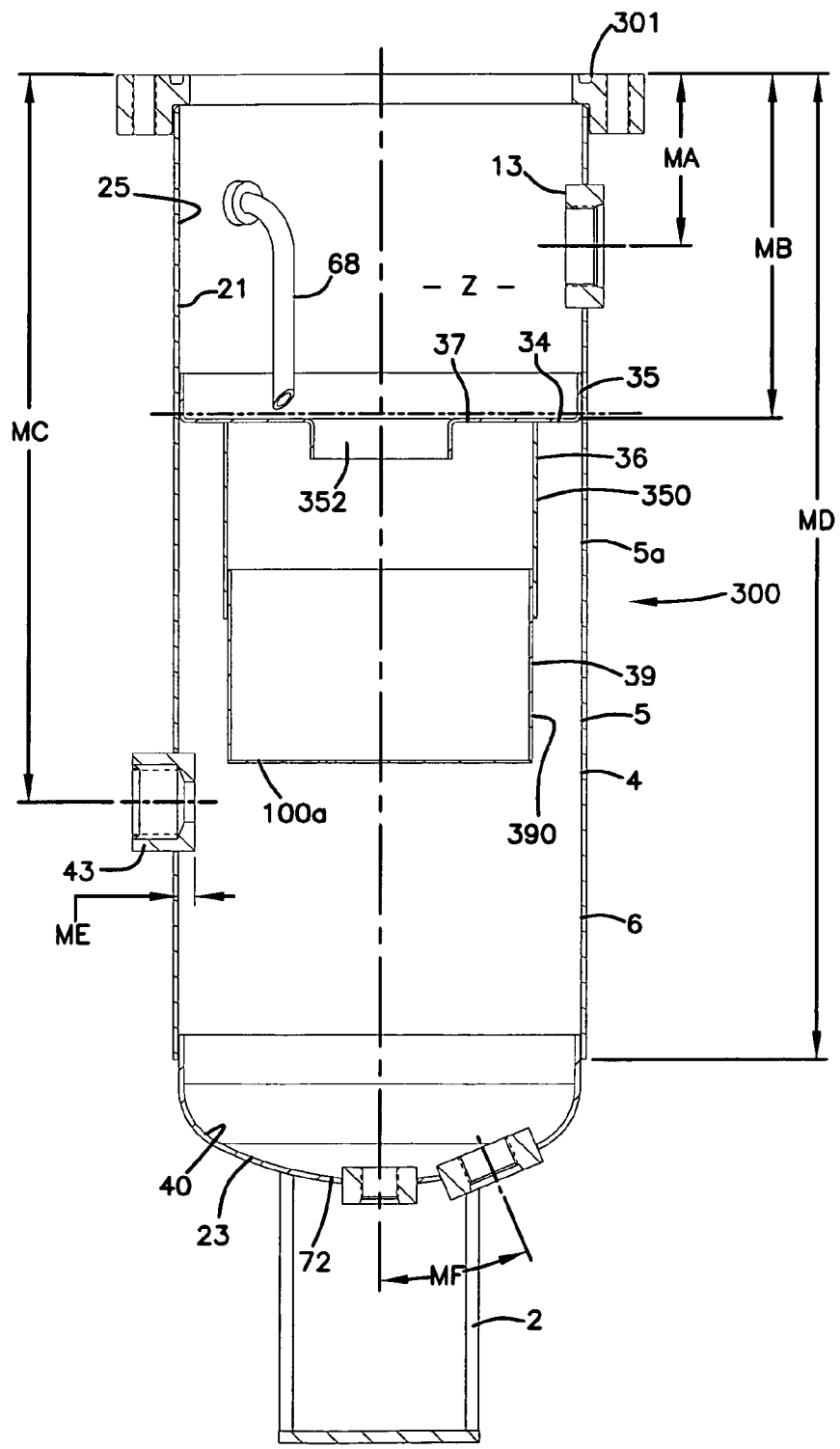
FIG. 9 is a cross-sectional view analogous to FIG. 8, depicting the inlet baffle assembly of FIG. 10 positioned therein.

The plate 100a is also viewable in the overall assembly depictions of FIGS. 8 and 9, for the various arrangements depicted therein.

In FIG. 4, at 37, base component of the inlet baffle arrangement 100 is depicted. In FIG. 4 reference numerals in accord with those used in FIG. 2 are shown, for analogous parts.

Figure 5:
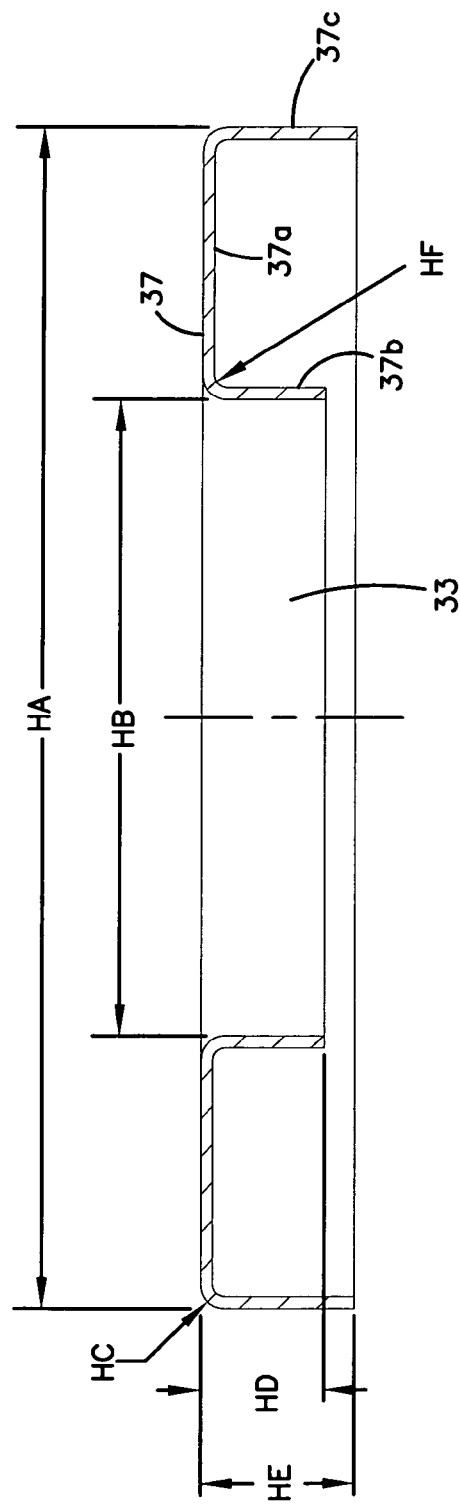
FIG. 5 is an enlarged cross-sectional view of the component depicted in FIG. 4.

In FIG. 5, the base 37 is shown in cross-section. The dimensions in FIG. 5 in the example shown are as follows: HA=185.7 mm; HB=100 mm; HC=3.8 mm radius; HD=19 mm; HE=23.8 mm; and, HF=1.9 mm radius.

Figure 6:
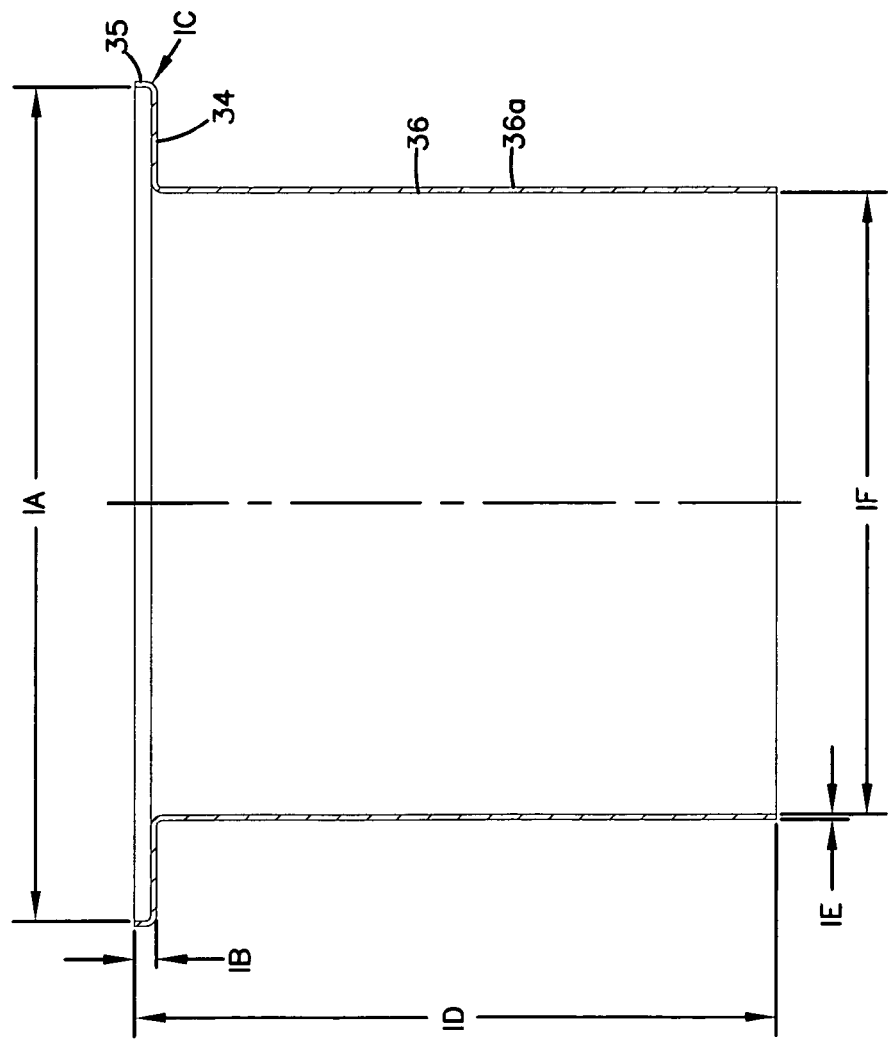
FIG. 6 is an enlarged cross-sectional view of a second component used in the inlet baffle arrangement of FIG. 3.

In FIG. 6 another component of the inlet baffle arrangement 100 in FIG. 3, is shown. The component depicted in FIG. 6 comprises: annular cover or hood 34, peripheral mounting ring 35 and depending central baffle wall 36. These components can generally be as described above for the tube sheet structure 28. In FIG. 6, the indicated dimensions for the example shown are as follows: IA=251 mm; IB=6.4 mm; IC=3.1 mm radius; ID=189 mm; IE=1.5 mm; and IF=187.3 mm.

Figure 7:
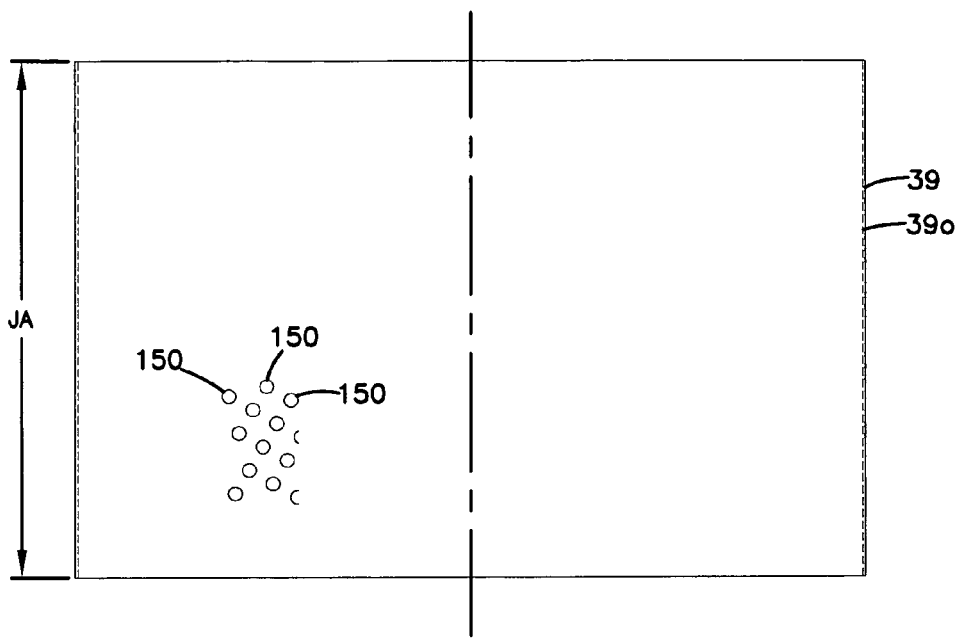
FIG. 7 is a schematic, enlarged, side elevational view of a third component of the inlet baffle arrangement depicted in FIG. 3.

In FIG. 7, a dependent porous shroud component 39 for the assembly 100, FIG. 3, is depicted. In FIG. 7 the example dimension shown is as follows: JA=127 mm.

Figure 7A:
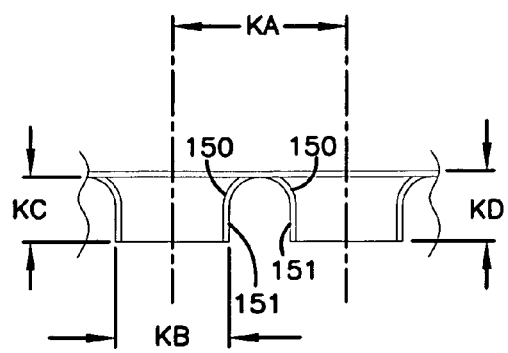
FIG. 7A is an enlarged, fragmentary cross-sectional view depicting features of the perforation pattern used in the component of FIG. 7.

The example shroud 39 depicted in FIG. 7, would typically use a staggered perforation pattern, with at least 30% open, typically 35%-50%, for example 40% open, usually from galvanized metal. In FIG. 7A, the perf pattern is shown in cross-section, with example dimensions as follows: KA=10.32 mm; KB=6.73 mm; KC=1.9 mm; and, KD=2.7 mm. The projection 101 around each perforation would typically be directed to an outside of shroud 39.

For the example shown in FIGS. 7 and 7a, the individual perforations 150 in the perforated shroud 39, are of a type generally characterized herein as "shielded" perforations. By this it is meant that at an outside surface 39o of perforated shroud 39, each of the apertures 150 has a shield 151 associated therewith. The shields 150 projects outwardly from surface 39o. Shield 151 may comprise a collar extending completely around (360°) an associated aperture 150. This type of shield arrangement is shown in FIG. 7a, in cross-section. On the other hand, a shield can extend over or around only a portion of the associate aperture 150, for example above each aperture 150.

In general, as liquid collects on surface 39o, and begins to drip downwardly, it will drip around the shields 151, and is less likely to run through the apertures 150 to possibly become reentrained within gases flowing along an inside of shroud 39, toward a separator assembly. The shields 151, then, help block liquid from draining through the apertures 150. 360° shields or full collars like shields 151, that extend completely around each aperture 150, are particularly convenient since they will deflect flow on surface 39o around the apertures. A typical shield projects outwardly from adjacent portions of surface 39o at least 1.0 mm, typically at least 1.5 mm; for example 1.5-2.8 mm. Thus, surface 39o is contoured.

In a typical example of use of the inlet baffle arrangement 100 of FIG. 3, the porous shroud 39 would not extend downwardly into a liquid within a lower sump, in the housing, rather it would stop at a location above the operational liquid level.

In FIG. 8, a housing 200 for a gas/liquid separator assembly analogous to assembly 1, FIG. 2, as depicted. It is noted that the cross-section of FIG. 8 is taken at a location different from that used for FIG. 2, so different features are viewable. In general, analogous reference numerals to those previous, indicate similarly operating parts. The particular assembly 200 of FIG. 8, includes inlet baffle arrangement 100, FIG. 3, mounted therein.

In FIG. 8, the identified dimensions are as follows: LA=346.1 mm; LB=560.3 mm; LC=722.4 mm; LD=6.4 mm; and LE=23°. Assembly 200 of FIG. 8, would normally be used with an in-to-out flow serviceable separator arrangement positioned within region Z in FIG. 8; the assembly 200 being depicted without the separator arrangement in place.

The separator arrangement can be generally in accord with those described above, for separator arrangement 9. Of course, when assembly 200 is used, a top plate would be secured in position at 201.

In FIG. 9, an alternate separator assembly 300 is depicted, in a view analogous to FIG. 8. Again, in FIG. 9, the assembly 300 is depicted without a cover at top end 301, which would normally be used during operation. Also, assembly 300 is depicted without a separator arrangement positioned in region Z. A separator arrangement in accord with that described above for arrangement 9, would typically be used.

In FIG. 9, analogous components to those previously discussed are numbered accordingly. In FIG. 9, the particular inlet baffle arrangement used, is indicated at reference numeral 350. It is noted that for the arrangement of FIG. 9, the non-porous baffle 36, depends from base 37, and does not project upwardly therefrom. However, porous baffle 39 still depends from baffle 36, and is still below base 37.

Figure 10:
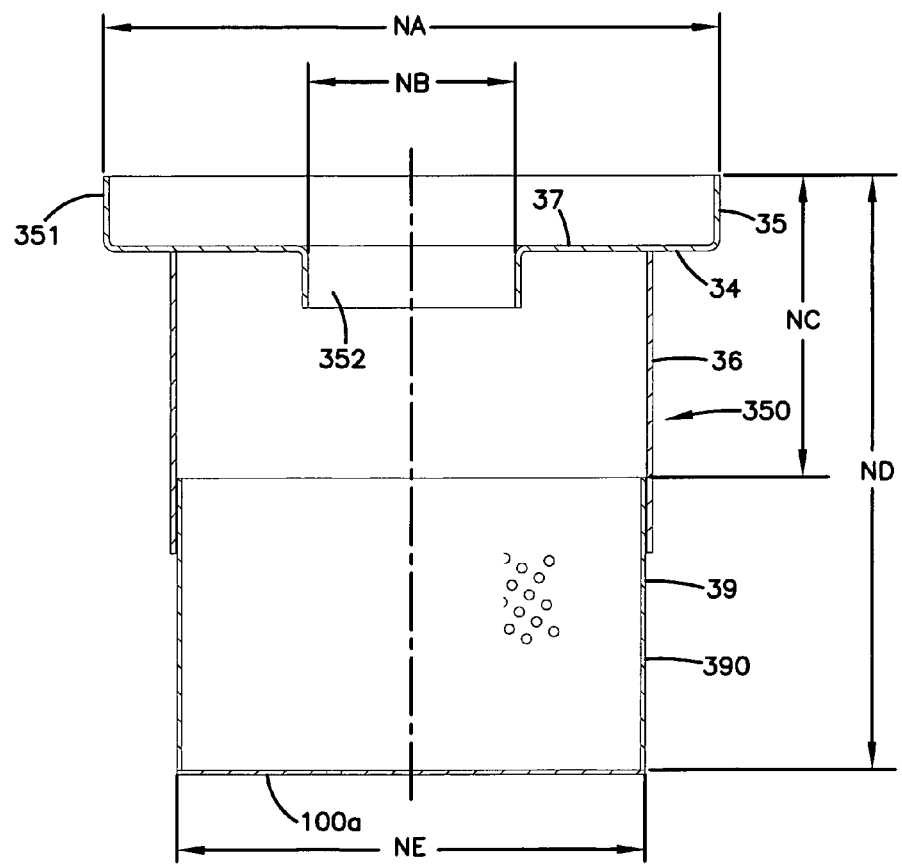
FIG. 10 is an inlet baffle assembly used in the depiction of FIG. 9.

In FIG. 10, assembly 350 is depicted.

In FIG. 9, the dimensions indicated are as follows: MA=88.9 mm; MB=177.8 mm; MC=375.9 mm; MD=509.3 mm; ME=8.3 mm; and MF=23°.

In FIG. 10, the dimensions indicated are as follows: NA=203.2 mm; NB 68.3 mm; NC=101.6 mm; ND=200 mm; NE=154.2 mm.

Again, it is noted that the baffle arrangement 350 does not include a portion that will extend along the length of any internally received serviceable separator arrangement or cartridge, at least 20% of the length, and not more than 60% of the length. Rather assembly 350 includes a mounting area 351 flush against inner wall of the housing, during mounting, and no part spaced from the housing wall and extending upwardly into the mounting space Z, from bottom or base 37.

The assembly of FIGS. 9 and 10 is particularly configured for use with a compressor of 30 hp, with in-to-out flow for the separator(s).

It is noted that in the example of FIGS. 9 and 10, the perforated shroud 39 does not include shielded apertures therein, but rather shroud 39 is simply a perforated metal shroud with a non-contoured outer surface, 39_o_.

A variety of different styles, shapes and types of separator arrangements can be mounted in assembly 300, sealed at 352. In general, descriptions previously given for separators can be applied.

IV. Assembly of Arrangements According to the Present Disclosure

Arrangements according to the present disclosure can be provided by converting pressure vessels by installation therein of a shroud assembly having a depending porous shroud 39, generally as described. The arrangement can be mounted in place, by securing annular region 35 to sidewall 5_a_.

What is claimed is:

1. A gas/liquid separator assembly comprising:
   (a) a pressure vessel including an outer wall and having a gas flow inlet, a gas flow outlet, and a lower sump;
   (b) a preseparation assembly positioned within the pressure vessel including:
      (i) a radially continuous, impermeable, axial shroud positioned spaced from the vessel outer wall to define a gas flow annulus therebetween;
      (ii) a cover extending between the vessel outer wall and the axial shroud at a location above the gas flow inlet and below the gas flow outlet;
      (iii) a base; and
      (iv) a porous shroud extending downwardly from the impermeable axial shroud and located below the base; and
   (c) a mounting space in the base configured to mount at least one removable and replaceable separator element.

2. A gas/liquid separator assembly according to claim 1, wherein:
   (a) the mounting space is surrounded by and spaced from the gas flow inlet by the axial shroud.

3. A gas/liquid separator assembly according to claim 1, wherein:
   (a) the porous shroud is at least 30% porous and extends downwardly from the radially continuous, impermeable, axial shroud a distance of at least 80 mm.

4. A gas/liquid separator assembly according to claim 1, wherein:
   (a) the axial shroud extends along a distance of at least 20%, and not more than 60%, of an axial length of the mounting space for the at least one removable and replaceable separator element.

5. A gas/liquid separator assembly according to claim 1, wherein:
   (a) the axial shroud extends along a distance of at least 35%, and not more than 60%, of an axial length of the mounting space for the at least one removable and replaceable separator element.

6. A gas/liquid separator assembly according to claim 1, wherein:
   (a) the axial shroud extends along a distance of at least 35%, and not more than 50%, of an axial length of the mounting space for the at least one removable and replaceable separator element.

7. A gas/liquid separator assembly according to claim 1, wherein:
   (a) the gas flow inlet is a tangential flow inlet.

8. A gas/liquid separator assembly according to claim 1, wherein:
   (a) the axial shroud is cylindrical.

9. A gas/liquid separator assembly according to claim 1, wherein:
   (a) the outer wall is generally cylindrical.

10. A gas/liquid separator assembly according to claim 1, wherein:
    (a) the at least one removable and replaceable separator element is configured for in-to-out flow.

11. A gas/liquid separator assembly according to claim 1 wherein:
    (a) the at least one removable and replaceable separator element is configured for in-to-out flow and comprises a media pack having a coalescing stage surrounded by a drain stage.

12. A gas/liquid separator assembly according to claim 1 including:
    (a) one removable and replaceable separator element.

13. A gas/liquid separator assembly according to claim 1 including:
    (a) a bottom plate extending across a bottom of the porous shroud.

14. A method of preparing a gas/liquid separator assembly comprising:
    (a) mounting a preseparation assembly in a pressure vessel having an outer wall, gas flow inlet, and a gas flow outlet, the preseparation assembly including: a radially continuous, impermeable, axial shroud positioned spaced from the vessel outer wall to define a gas flow annulus therebetween; a cover extending between the vessel outer wall and the axial shroud at a location above the gas flow inlet and below the gas flow outlet; a base; and a porous shroud extending downwardly from the impermeable axial shroud at least 80 mm.

* * * * *